Nov. 18, 1930.  L. H. CUMMINGS  1,781,977

COLLAPSIBLE TABLE FOR AUTOMOBILES

Filed April 28, 1928

Inventor
Leon H. Cummings.

By Clarence A. O'Brien
Attorney

Patented Nov. 18, 1930

1,781,977

UNITED STATES PATENT OFFICE

LEON H. CUMMINGS, OF WARE, MASSACHUSETTS

COLLAPSIBLE TABLE FOR AUTOMOBILES

Application filed April 28, 1928. Serial No. 273,630.

The present invention relates to collapsible tables for automobiles, and has for an object to arrange a table at the rear of the front seat of the automobile in position for convenient use by the occupants of the rear seat thereof, and supporting the rear edge of the table hingedly upon the usual robe rail or other support attached at the rear of the front seat, and with the front edge of the table supported upon one or more foldable legs, so that the table top may be swung downwardly into an out of the way position against the rear of the front seat, when desired.

A further object of the invention is to support a table of this character in the manner indicated, and providing a supporting means so that the table may be easily and quickly removed from or placed in position in the automobile, when desired.
An additional object is to provide an article of this character, of a simple and practical construction, which is neat and attractive in appearance, strong and durable, relatively inexpensive to manufacture, and otherwise well adapted to the purpose for which the same is intended.

Other objects and advantages reside in the special construction and combination of the various elements comprising the invention, reference being had to the accompanying drawings, forming a part hereof, wherein.

Figure 2:
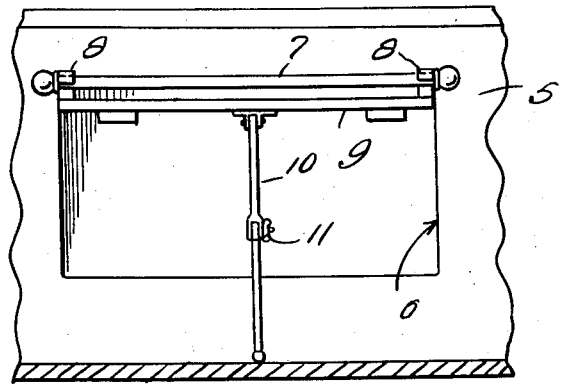
Figure 2 is a front elevational view of the table, ready for use.
Figure 3:
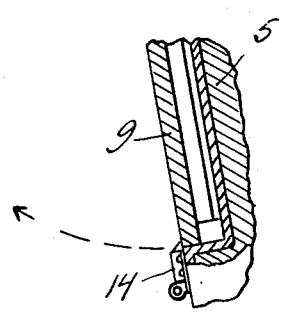
Figure 3 is a fragmentary sectional view of the rear of the front seat, showing the table folded in the recess provided therefor.

Referring now to the drawing, in detail, 1 have shown my invention arranged in operative position, with respect to an automobile body of conventional construction, the front seat of which is indicated at 5, with a relatively shallow recess 6, formed in the rear vertical side of said seat. Adjacent the upper edge of said recess is secured a rail 7, supported in spaced relation to the back of the seat, in a manner similar to the usual robe rail, said rod being disposed horizontally as clearly illustrated in Figure 2 of the drawings.

Figure 1:
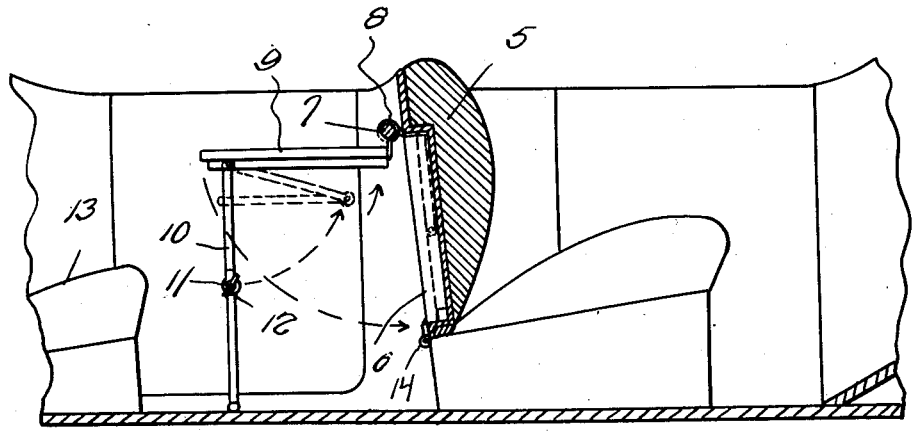
Figure 1 is a fragmentary longitudinal sectional view, through the body of an automobile, showing the table for use in front of the rear seat of the automobile.

Adjacent the ends of the rods is arranged a pair of hooks 8, having one end secured to the rear edge of a table top 9, said hooks supporting the top so as to permit the vertical swinging movement thereof. To the under side of the top at the forward edge thereof and intermediate the ends of the top is pivotally attached a sectional table leg 10, with the sections thereof pivotally connected to each other at one end, permitting the band to be arranged in vertically extended position supporting the top 9 at a horizontal plane. The sections of the leg 10 may be connected by a bolt and wing nut indicated at 11 and 12 respectively, whereby to secure the same in extended positions. In this manner, the table will be supported in a convenient position for use by the occupant of the rear seat of the automobile, indicated at 13. The leg 10 may be folded upwardly into a position as shown by the dotted lines in Figure 1 of the drawings, whereupon the top 9 will be permitted to swing downwardly within the recess 6, with the outer edge of the table flush with the rear of the front seat 5. At the lower edge of the recess 6 is arranged a snap catch 14, engageable with the adjacent edge of the table top 9, so as to secure the same within the recess. In this manner, the complete table may be secured in an out of the way position when not in use and may be easily and quickly unfolded and secured for use by the occupants of the machine in a desired manner.

It is obvious that the invention is susceptible of various changes and modifications, without departing from the spirit or scope of the invention or sacrificing any of its advantages, and I accordingly claim all such forms of the device, to which I am entitled.

Having thus described my invention, what I claim as new is:

In combination, an automobile seat including an upright back portion having a comparatively shallow open compartment therein, a horizontal rod secured to the rear surface of the back portion of said seat in spaced relation therefrom and adjacent the upper end of the compartment, a table top and suspension means for one edge of the table top adapted for supporting the same in either a vertical position in the compartment or a horizontal position and comprising a plurality of hooks extending laterally and upwardly above the upper surface of the top, from one edge thereof and adapted for detachable engagement with said rod.

In testimony whereof I affix my signature.

LEON H. CUMMINGS.